United States Patent
Liu et al.

(10) Patent No.: US 10,474,437 B2
(45) Date of Patent: Nov. 12, 2019

(54) STREAMLINED FAST AND EFFICIENT APPLICATION BUILDING AND CUSTOMIZATION SYSTEMS AND METHODS

(71) Applicant: Open Text SA ULC, Halifax (CA)

(72) Inventors: Man Cheong Liu, Sutton (GB); Simon Day, Westbury (GB)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 15/717,631

(22) Filed: Sep. 27, 2017

(65) Prior Publication Data

US 2018/0018150 A1    Jan. 18, 2018

Related U.S. Application Data

(63) Continuation of application No. 15/340,695, filed on Nov. 1, 2016.
(Continued)

(51) Int. Cl.
*G06F 8/35*    (2018.01)
*G06F 8/60*    (2018.01)
(Continued)

(52) U.S. Cl.
CPC ............... *G06F 8/35* (2013.01); *G06F 8/60* (2013.01); *G06F 8/63* (2013.01); *G06F 8/71* (2013.01)

(58) Field of Classification Search
CPC ..... G06F 8/63; G06F 8/35; G06F 8/60; G06F 8/71
(Continued)

(56) References Cited

U.S. PATENT DOCUMENTS 5,517,549 A    5/1996 Lee
5,727,155 A    3/1998 Dawson
(Continued)

FOREIGN PATENT DOCUMENTS

CA    2698066 A1 *  1/2011  ............... G06F 8/71
EP    2003854 A1   12/2008
(Continued)

OTHER PUBLICATIONS

Notice of Allowance for U.S. Appl. No. 14/491,483, dated Nov. 16, 2017, 12 pages.
(Continued)

*Primary Examiner* — Jason D Mitchell
(74) *Attorney, Agent, or Firm* — Sprinkle IP Law Group

(57) ABSTRACT

A system may receive a request from a user to build a custom application specific to an operating system (OS) platform. The system may include an application gateway and the custom application may be a user-customized variation of an application gateway client. The system may prepare a build request and send it to a bonding client running on a work station specific to the OS platform. The bonding client may execute build scripts with user-provided configuration information to create the custom application. Instead of submitting the custom application to a third-party digital distribution platform, the bonding client may store the custom application in a storage location accessible by the system. The system, responsive to the request from the user, may send a response to the computing device, the response containing a link to the storage location of the custom application.

20 Claims, 6 Drawing Sheets

Related U.S. Application Data

(60) Provisional application No. 62/250,175, filed on Nov. 3, 2015.

(51) Int. Cl.
*G06F 8/61* (2018.01)
*G06F 8/71* (2018.01)

(58) Field of Classification Search
USPC .................................................. 717/106
See application file for complete search history.

(56) References Cited

U.S. PATENT DOCUMENTS

| | | | |
|---|---|---|---|
| 5,920,861 A | 7/1999 | Hall | |
| 5,995,756 A | 11/1999 | Herrmann | |
| 6,088,747 A | 7/2000 | Cotugno | |
| 6,226,788 B1 * | 5/2001 | Schoening | H04L 41/0213 |
| | | | 709/203 |
| 6,286,039 B1 | 9/2001 | Van Horne et al. | |
| 6,289,462 B1 | 9/2001 | McNabb et al. | |
| 6,438,695 B1 | 8/2002 | Maufer | |
| 6,553,375 B1 | 4/2003 | Huang | |
| 6,886,017 B1 | 4/2005 | Jackson et al. | |
| 7,146,617 B2 | 12/2006 | Mukundan et al. | |
| 7,197,041 B1 | 3/2007 | Tyebji | |
| 7,249,369 B2 | 7/2007 | Knouse et al. | |
| 7,356,679 B1 | 4/2008 | Le | |
| 7,457,279 B1 | 11/2008 | Scott | |
| 7,464,367 B2 * | 12/2008 | Wain | G06F 8/34 |
| | | | 715/762 |
| 7,464,386 B2 | 12/2008 | Millington | |
| 7,519,470 B2 | 4/2009 | Brasche et al. | |
| 7,543,118 B1 | 6/2009 | Chen et al. | |
| 7,720,975 B2 | 5/2010 | Erickson | |
| 7,769,747 B2 | 8/2010 | Berg | |
| 7,818,410 B1 | 10/2010 | Barnes | |
| 7,890,591 B2 | 2/2011 | Agrawal et al. | |
| 8,079,059 B1 | 12/2011 | Lee | |
| 8,214,747 B1 | 7/2012 | Yankovich | |
| 8,239,918 B1 | 8/2012 | Cohen | |
| 8,312,356 B1 | 11/2012 | Cousins | |
| 8,356,999 B2 | 1/2013 | Imai | |
| 8,407,265 B1 | 3/2013 | Scheer | |
| 8,458,232 B1 | 6/2013 | Spertus et al. | |
| 8,490,165 B2 | 7/2013 | Wray | |
| 8,522,130 B1 | 8/2013 | Gilead et al. | |
| 8,613,070 B1 | 12/2013 | Borzycki et al. | |
| 8,649,768 B1 | 2/2014 | Gaddam | |
| 8,650,303 B1 | 2/2014 | Lang et al. | |
| 8,666,383 B1 * | 3/2014 | Mauer | G06Q 30/0267 |
| | | | 455/418 |
| 8,677,132 B1 | 3/2014 | Liao et al. | |
| 8,682,701 B1 | 3/2014 | Knauth et al. | |
| 8,682,901 B1 | 3/2014 | Cao et al. | |
| 8,717,166 B2 | 5/2014 | Diem | |
| 8,725,645 B1 | 5/2014 | Montini | |
| 8,775,573 B2 | 7/2014 | Ebling et al. | |
| 8,805,956 B1 | 8/2014 | Yang et al. | |
| 8,832,681 B1 | 9/2014 | Cantrell | |
| 8,849,978 B1 | 9/2014 | Batson et al. | |
| 8,938,781 B1 | 1/2015 | Bobel | |
| 9,069,638 B2 | 6/2015 | Saldhana | |
| 9,092,290 B1 | 7/2015 | Bono et al. | |
| 9,098,857 B1 | 8/2015 | Brown | |
| 9,130,921 B2 | 9/2015 | Boubez | |
| 9,131,381 B1 | 9/2015 | Sobel | |
| 9,143,530 B2 | 9/2015 | Qureshi et al. | |
| 9,189,771 B2 | 11/2015 | Watanabe | |
| 9,201,678 B1 | 12/2015 | Bacher | |
| 9,270,674 B2 | 2/2016 | Lang et al. | |
| 9,286,471 B2 | 3/2016 | Qureshi et al. | |
| 9,304,745 B2 * | 4/2016 | Nair | G06F 8/10 |
| 9,525,601 B2 | 12/2016 | Jang | |
| 9,674,225 B2 | 6/2017 | Beckman et al. | |
| 9,747,466 B2 | 8/2017 | Beckman et al. | |
| 9,979,751 B2 | 5/2018 | Beckman et al. | |
| 10,116,697 B2 | 10/2018 | Beckman et al. | |
| 10,171,501 B2 | 1/2019 | Beckman et al. | |
| 10,268,835 B2 | 4/2019 | Beckman et al. | |
| 10,284,600 B2 | 5/2019 | Beckman et al. | |
| 2001/0051515 A1 | 12/2001 | Rygaard | |
| 2002/0116698 A1 | 8/2002 | Lurie et al. | |
| 2002/0147611 A1 | 10/2002 | Greene | |
| 2002/0156928 A1 | 10/2002 | Goodman | |
| 2002/0188842 A1 | 12/2002 | Willeby | |
| 2003/0023657 A1 * | 1/2003 | Fischer | G06F 8/60 |
| | | | 718/102 |
| 2003/0054810 A1 | 3/2003 | Chen | |
| 2003/0069923 A1 | 4/2003 | Peart | |
| 2003/0110272 A1 | 6/2003 | Du Castel et al. | |
| 2003/0110443 A1 | 6/2003 | Yankovich et al. | |
| 2003/0149653 A1 * | 8/2003 | Penney | G06Q 40/00 |
| | | | 705/37 |
| 2003/0177473 A1 | 9/2003 | Banerjee | |
| 2003/0191800 A1 | 10/2003 | Challenger et al. | |
| 2004/0039720 A1 | 2/2004 | Hodges | |
| 2004/0122907 A1 | 6/2004 | Chou | |
| 2004/0177359 A1 | 9/2004 | Bauch et al. | |
| 2004/0194060 A1 * | 9/2004 | Ousterhout | G06F 8/41 |
| | | | 717/120 |
| 2004/0199469 A1 | 10/2004 | Barillova et al. | |
| 2004/0205748 A1 * | 10/2004 | Iyer | G06F 8/71 |
| | | | 717/174 |
| 2004/0215700 A1 | 10/2004 | Shenfield et al. | |
| 2005/0027584 A1 | 2/2005 | Fusari | |
| 2005/0027887 A1 | 2/2005 | Zimler | |
| 2005/0039034 A1 | 2/2005 | Doyle et al. | |
| 2005/0050071 A1 | 3/2005 | Debrunner | |
| 2005/0055578 A1 | 3/2005 | Wright | |
| 2005/0078944 A1 | 4/2005 | Risan et al. | |
| 2005/0102329 A1 | 5/2005 | Jiang et al. | |
| 2005/0138618 A1 * | 6/2005 | Gebhart | G06F 8/60 |
| | | | 717/176 |
| 2005/0182958 A1 | 8/2005 | Pham et al. | |
| 2005/0193139 A1 | 9/2005 | Vinson et al. | |
| 2005/0198100 A1 | 9/2005 | Goring et al. | |
| 2005/0240558 A1 | 10/2005 | Gil et al. | |
| 2005/0240616 A1 | 10/2005 | Alcorn et al. | |
| 2005/0256834 A1 | 11/2005 | Millington | |
| 2006/0015562 A1 | 1/2006 | Kilian-Kehr | |
| 2006/0030333 A1 | 2/2006 | Ward et al. | |
| 2006/0037030 A1 | 2/2006 | Kovachka | |
| 2006/0047806 A1 | 3/2006 | Bannach | |
| 2006/0075472 A1 | 4/2006 | Sanda et al. | |
| 2006/0085648 A1 | 4/2006 | Cheston | |
| 2006/0122987 A1 | 6/2006 | Angelo | |
| 2006/0138224 A1 | 6/2006 | Azami et al. | |
| 2006/0143133 A1 | 6/2006 | Medvinsky | |
| 2006/0230402 A1 | 10/2006 | Newport et al. | |
| 2006/0234731 A1 | 10/2006 | Taylor et al. | |
| 2006/0235973 A1 | 10/2006 | McBride et al. | |
| 2006/0248069 A1 | 11/2006 | Qing et al. | |
| 2006/0248590 A1 | 11/2006 | Johnson | |
| 2006/0253548 A1 | 11/2006 | Vitanov | |
| 2006/0277248 A1 | 12/2006 | Baxter et al. | |
| 2006/0277590 A1 | 12/2006 | Limont et al. | |
| 2007/0011292 A1 | 1/2007 | Fritsch et al. | |
| 2007/0022475 A1 | 1/2007 | Rossi et al. | |
| 2007/0038714 A1 | 2/2007 | Sell | |
| 2007/0061373 A1 | 3/2007 | Kilday | |
| 2007/0061488 A1 | 3/2007 | Alagappan et al. | |
| 2007/0091848 A1 | 4/2007 | Karia et al. | |
| 2007/0120736 A1 | 5/2007 | MacKenzie et al. | |
| 2007/0156726 A1 | 7/2007 | Levy | |
| 2007/0165615 A1 | 7/2007 | Shin et al. | |
| 2007/0180477 A1 | 8/2007 | Hutcheson | |
| 2007/0243880 A1 | 10/2007 | Gits | |
| 2007/0250614 A1 | 10/2007 | Szabo | |
| 2007/0250839 A1 * | 10/2007 | Van Der Sanden | G06F 9/542 |
| | | | 719/315 |
| 2008/0010372 A1 | 1/2008 | Khedouri et al. | |
| 2008/0014929 A1 | 1/2008 | Padmanabhuni et al. | |
| 2008/0046557 A1 | 2/2008 | Cheng | |

(56) References Cited

U.S. PATENT DOCUMENTS

| | | | |
|---|---|---|---|
| 2008/0071820 A1 | 3/2008 | Mori et al. | |
| 2008/0098094 A1* | 4/2008 | Finkelstein | G06F 9/4411 |
| | | | 709/220 |
| 2008/0098237 A1 | 4/2008 | Dung et al. | |
| 2008/0163340 A1 | 7/2008 | Cheeniyil | |
| 2008/0172414 A1 | 7/2008 | Tien et al. | |
| 2008/0177598 A1 | 7/2008 | Davie | |
| 2008/0215744 A1 | 9/2008 | Shenfield | |
| 2008/0240142 A1 | 10/2008 | Belgaied | |
| 2008/0270977 A1* | 10/2008 | Nucci | G06F 8/10 |
| | | | 717/105 |
| 2008/0282205 A1 | 11/2008 | Dykstra-Erickson et al. | |
| 2008/0311886 A1 | 12/2008 | Smith | |
| 2009/0003600 A1 | 1/2009 | Chen | |
| 2009/0006434 A1 | 1/2009 | Fowler | |
| 2009/0007218 A1 | 1/2009 | Hubbard | |
| 2009/0138877 A1 | 5/2009 | Fitzgerald et al. | |
| 2009/0144828 A1 | 6/2009 | Thomlinson | |
| 2009/0157882 A1 | 6/2009 | Kashyap | |
| 2009/0228821 A1 | 9/2009 | Tapper | |
| 2009/0282399 A1 | 11/2009 | Kamrowski | |
| 2009/0282403 A1 | 11/2009 | Poole | |
| 2009/0327262 A1 | 12/2009 | Grack et al. | |
| 2010/0017461 A1 | 1/2010 | Kokkevis et al. | |
| 2010/0043017 A1 | 2/2010 | Paul et al. | |
| 2010/0050167 A1 | 2/2010 | Bibr et al. | |
| 2010/0122274 A1 | 5/2010 | Gillies et al. | |
| 2010/0144309 A1 | 6/2010 | Nalley et al. | |
| 2010/0198651 A1* | 8/2010 | Johnson | G06Q 10/06 |
| | | | 705/7.11 |
| 2010/0202450 A1 | 8/2010 | Ansari | |
| 2010/0203960 A1 | 8/2010 | Wilson et al. | |
| 2010/0210240 A1 | 8/2010 | Mahaffey et al. | |
| 2010/0235820 A1 | 9/2010 | Khouzam | |
| 2010/0269096 A1 | 10/2010 | Araya | |
| 2010/0312817 A1 | 12/2010 | Steakley | |
| 2010/0325717 A1 | 12/2010 | Goel et al. | |
| 2011/0035742 A1* | 2/2011 | Shenfield | G06F 9/44521 |
| | | | 717/171 |
| 2011/0126192 A1 | 5/2011 | Frost et al. | |
| 2011/0126193 A1* | 5/2011 | Mullin | G06F 8/63 |
| | | | 718/1 |
| 2011/0141276 A1 | 6/2011 | Borghei | |
| 2011/0145930 A1 | 6/2011 | Gnech et al. | |
| 2011/0167470 A1 | 7/2011 | Walker | |
| 2011/0179126 A1 | 7/2011 | Wetherell | |
| 2011/0191822 A1 | 8/2011 | Pinsky et al. | |
| 2011/0213857 A1 | 9/2011 | Philipeit | |
| 2011/0218965 A1 | 9/2011 | Lee | |
| 2011/0258658 A1 | 10/2011 | Mobasser | |
| 2011/0277027 A1 | 11/2011 | Hayton et al. | |
| 2011/0289187 A1 | 11/2011 | Brodin | |
| 2011/0302239 A1 | 12/2011 | Grateau | |
| 2011/0314389 A1 | 12/2011 | Meredith et al. | |
| 2012/0005041 A1 | 1/2012 | Mehta | |
| 2012/0084184 A1 | 4/2012 | Raleigh | |
| 2012/0089668 A1 | 4/2012 | Berg et al. | |
| 2012/0094685 A1 | 4/2012 | Marsico | |
| 2012/0110112 A1 | 5/2012 | Luna et al. | |
| 2012/0117611 A1 | 5/2012 | Wookey | |
| 2012/0129503 A1 | 5/2012 | Lindeman et al. | |
| 2012/0129572 A1 | 5/2012 | Johnstone et al. | |
| 2012/0143728 A1 | 6/2012 | Bhogal et al. | |
| 2012/0185398 A1 | 7/2012 | Weis et al. | |
| 2012/0185863 A1 | 7/2012 | Krstic et al. | |
| 2012/0185912 A1 | 7/2012 | Lee | |
| 2012/0212323 A1 | 8/2012 | Skaaksrud et al. | |
| 2012/0220263 A1* | 8/2012 | Smith | H04W 4/60 |
| | | | 455/410 |
| 2012/0226767 A1 | 9/2012 | Luna et al. | |
| 2012/0240236 A1 | 9/2012 | Wyatt | |
| 2012/0278117 A1 | 11/2012 | Nguyen | |
| 2012/0290686 A1 | 11/2012 | Anchan et al. | |
| 2012/0304310 A1 | 11/2012 | Blaisdell | |
| 2012/0311527 A1* | 12/2012 | Lee | G06F 8/30 |
| | | | 717/106 |
| 2012/0314864 A1 | 12/2012 | Ramprasad | |
| 2012/0317370 A1 | 12/2012 | Luna | |
| 2012/0331527 A1 | 12/2012 | Walters et al. | |
| 2013/0007245 A1 | 1/2013 | Malik et al. | |
| 2013/0014006 A1 | 1/2013 | Abellera et al. | |
| 2013/0031159 A1 | 1/2013 | Xiao | |
| 2013/0054702 A1 | 2/2013 | Belchee et al. | |
| 2013/0061289 A1 | 3/2013 | McFarland et al. | |
| 2013/0061307 A1 | 3/2013 | Livne | |
| 2013/0067449 A1 | 3/2013 | Sannidhanam et al. | |
| 2013/0080636 A1 | 3/2013 | Friedman et al. | |
| 2013/0081033 A1 | 3/2013 | Levien et al. | |
| 2013/0084846 A1 | 4/2013 | Walker et al. | |
| 2013/0091557 A1 | 4/2013 | Gurrapu | |
| 2013/0110672 A1 | 5/2013 | Yang et al. | |
| 2013/0111460 A1 | 5/2013 | Mohamed et al. | |
| 2013/0111573 A1 | 5/2013 | Mani | |
| 2013/0111598 A1 | 5/2013 | Marcovecchio et al. | |
| 2013/0117414 A1 | 5/2013 | Dash | |
| 2013/0117563 A1 | 5/2013 | Grabelkovsky | |
| 2013/0124674 A1 | 5/2013 | Matsumoto | |
| 2013/0132422 A1 | 5/2013 | Rogish et al. | |
| 2013/0132854 A1 | 5/2013 | Raleigh et al. | |
| 2013/0152047 A1 | 6/2013 | Moorthi | |
| 2013/0159993 A1* | 6/2013 | Misovski | G06F 8/61 |
| | | | 717/177 |
| 2013/0159996 A1* | 6/2013 | Lin | G06F 8/60 |
| | | | 717/178 |
| 2013/0166417 A1* | 6/2013 | Pulkowski | G06Q 30/04 |
| | | | 705/27.1 |
| 2013/0174154 A1 | 7/2013 | Poore et al. | |
| 2013/0183951 A1 | 7/2013 | Chien | |
| 2013/0198764 A1 | 8/2013 | Kacin et al. | |
| 2013/0219006 A1 | 8/2013 | Kuo | |
| 2013/0219176 A1 | 8/2013 | Akella et al. | |
| 2013/0225282 A1 | 8/2013 | Williams et al. | |
| 2013/0227558 A1 | 8/2013 | Du et al. | |
| 2013/0231093 A1 | 9/2013 | Toy et al. | |
| 2013/0238808 A1 | 9/2013 | Hallem | |
| 2013/0239192 A1 | 9/2013 | Linga et al. | |
| 2013/0247222 A1 | 9/2013 | Maksim et al. | |
| 2013/0252585 A1 | 9/2013 | Moshir et al. | |
| 2013/0263212 A1 | 10/2013 | Faltyn et al. | |
| 2013/0268470 A1 | 10/2013 | Yablokov | |
| 2013/0275404 A1 | 10/2013 | Osetinsky | |
| 2013/0283262 A1* | 10/2013 | Rehtijarvi | G06F 8/60 |
| | | | 717/178 |
| 2013/0290718 A1 | 10/2013 | Zhuang et al. | |
| 2013/0290880 A1 | 10/2013 | Wu et al. | |
| 2013/0291086 A1 | 10/2013 | Pontillo et al. | |
| 2013/0297789 A1 | 11/2013 | Park et al. | |
| 2013/0298183 A1 | 11/2013 | McGrath et al. | |
| 2013/0298185 A1 | 11/2013 | Koneru | |
| 2013/0310159 A1 | 11/2013 | Froy et al. | |
| 2013/0347064 A1 | 12/2013 | Aissi | |
| 2014/0007214 A1 | 1/2014 | Qureshi | |
| 2014/0007215 A1 | 1/2014 | Romano | |
| 2014/0007222 A1 | 1/2014 | Qureshi et al. | |
| 2014/0012924 A1 | 1/2014 | Jagernauth | |
| 2014/0020068 A1 | 1/2014 | Desai et al. | |
| 2014/0025954 A1 | 1/2014 | Isozaki et al. | |
| 2014/0032647 A1 | 1/2014 | Nimura et al. | |
| 2014/0033299 A1 | 1/2014 | McGloin | |
| 2014/0047556 A1 | 2/2014 | Davis | |
| 2014/0059494 A1 | 2/2014 | Lee et al. | |
| 2014/0059642 A1 | 2/2014 | Deasy et al. | |
| 2014/0082135 A1 | 3/2014 | Jung et al. | |
| 2014/0089376 A1 | 3/2014 | Caldas et al. | |
| 2014/0095724 A1 | 4/2014 | Yoakum et al. | |
| 2014/0108474 A1 | 4/2014 | David et al. | |
| 2014/0108799 A1 | 4/2014 | Wang et al. | |
| 2014/0109174 A1 | 4/2014 | Barton et al. | |
| 2014/0120905 A1 | 5/2014 | Kim | |
| 2014/0130174 A1 | 5/2014 | Celi, Jr. | |
| 2014/0149485 A1 | 5/2014 | Sharma | |
| 2014/0164125 A1 | 6/2014 | Taylor | |
| 2014/0181894 A1 | 6/2014 | Von Bokern et al. | |

(56) References Cited

U.S. PATENT DOCUMENTS

| | | |
|---|---|---|
| 2014/0188601 A1 | 7/2014 | Buset |
| 2014/0188804 A1 | 7/2014 | Gokhale et al. |
| 2014/0189777 A1 | 7/2014 | Viswanathan |
| 2014/0195665 A1 | 7/2014 | Jang |
| 2014/0253466 A1 | 9/2014 | Brewer |
| 2014/0280276 A1 | 9/2014 | Prasanna |
| 2014/0280822 A1 | 9/2014 | Chennimalai et al. |
| 2014/0281531 A1 | 9/2014 | Phegade et al. |
| 2014/0282371 A1 | 9/2014 | Hirsch |
| 2014/0282829 A1 | 9/2014 | Dabbiere et al. |
| 2014/0295821 A1 | 10/2014 | Qureshi |
| 2014/0298420 A1 | 10/2014 | Barton |
| 2014/0304683 A1* | 10/2014 | Kim .......................... G06F 8/71 717/121 |
| 2014/0330990 A1 | 11/2014 | Lang |
| 2014/0331060 A1 | 11/2014 | Hayton |
| 2014/0344806 A1 | 11/2014 | Suresh |
| 2014/0359081 A1 | 12/2014 | Van Deventer |
| 2014/0366014 A1* | 12/2014 | Mair ........................ G06F 21/10 717/177 |
| 2014/0366080 A1 | 12/2014 | Gupta |
| 2014/0372980 A1* | 12/2014 | Verma ................... G06F 9/4451 717/121 |
| 2015/0006482 A1 | 1/2015 | Hardy et al. |
| 2015/0026617 A1 | 1/2015 | Liang |
| 2015/0039677 A1 | 2/2015 | Kahol et al. |
| 2015/0088934 A1 | 3/2015 | Beckman et al. |
| 2015/0089224 A1 | 3/2015 | Beckman et al. |
| 2015/0089577 A1 | 3/2015 | Beckman et al. |
| 2015/0089659 A1 | 3/2015 | Beckman et al. |
| 2015/0089673 A1 | 3/2015 | Beckman et al. |
| 2015/0128105 A1* | 5/2015 | Sethi ......................... G06F 8/36 717/106 |
| 2015/0193241 A1 | 7/2015 | Hamzata |
| 2015/0244774 A1 | 8/2015 | Jang |
| 2015/0277702 A1 | 10/2015 | Hardwick et al. |
| 2015/0278513 A1 | 10/2015 | Krasin et al. |
| 2015/0288671 A1 | 10/2015 | Chan |
| 2015/0310208 A1 | 10/2015 | Prabhu |
| 2015/0326557 A1 | 11/2015 | Teramura et al. |
| 2015/0333982 A1 | 11/2015 | Kang et al. |
| 2016/0026366 A1* | 1/2016 | Luan ................... G06F 3/04842 715/747 |
| 2016/0028688 A1 | 1/2016 | Chizhov |
| 2016/0092179 A1* | 3/2016 | Straub ....................... G06F 8/20 717/107 |
| 2016/0154629 A1 | 6/2016 | Noens |
| 2016/0188621 A1 | 6/2016 | Karinta |
| 2017/0123768 A1 | 5/2017 | Liu et al. |
| 2017/0201850 A1 | 7/2017 | Raleigh et al. |
| 2017/0249448 A1 | 8/2017 | Beckman et al. |
| 2017/0250853 A1 | 8/2017 | Evans |
| 2017/0316224 A1 | 11/2017 | Beckman et al. |
| 2018/0248915 A1 | 8/2018 | Beckman et al. |
| 2019/0036975 A1 | 1/2019 | Beckman et al. |
| 2019/0089746 A1 | 3/2019 | Beckman et al. |
| 2019/0228177 A1 | 7/2019 | Beckman et al. |
| 2019/0230130 A1 | 7/2019 | Beckman et al. |

FOREIGN PATENT DOCUMENTS

| | | |
|---|---|---|
| WO | WO2013023179 | 2/2013 |
| WO | WO2013151454 A1 | 10/2013 |

OTHER PUBLICATIONS

Carter, Fred et al, Enabling Portable Application Development for New Media Networks, Oracle Corp., IEEE, 1995, pp. 63-70.
Sadtler, Carla, WebSphere Application Server V6 Technical Overview, IBM Redbooks Paper, IBM Corp., 2004, 64 pages.
IEEE Std PC37.1™/D5, Draft Standard for SCADA and Automation Systems, Electronic Network Control Systems Standards Working Group of the Substations Committee, IEEE, Sep. 2007, 143 pages.
Tanenbaum, Andrew, et al., Report on the Seventh ACM SIGOPS European Workshop, Systems Support for Worldwide Applications, Sep. 9-11, 1996, Connemar, Ireland, pp. 5-17.
Office Action issued for U.S. Appl. No. 14/491,492, dated Nov. 13, 2017, 38 pages.
Notice of Allowance for U.S. Appl. No. 14/491,492, dated Apr. 24, 2018, 12 pgs.
Ross, Philip E., "Top 11 technologies of the decade," IEEE Spectrum 48, No. 1, 2011, 38 pgs.
Burguera, Iker, et al., "Crowdroid behavior-based malware detection system for android," In Proceedings of the 1st ACM Workshop on Security and Privacy in Smartphones and Mobile Devices, ACM, 2011, pp. 15-26.
Notice of Allowance for U.S. Appl. No. 15/653,017, dated Apr. 24, 2018, 5 pgs.
Office Action for U.S. Appl. No. 15/595,481, dated Jan. 18, 2018, 35 pgs.
Notice of Allowance for U.S. Appl. No. 15/653,017, dated Jan. 23, 2018, 8 pgs.
Notice of Allowance for U.S. Appl. No. 14/491,386, dated Mar. 28, 2018, 13 pgs.
Bruhn, "Comprehensive Support for Management of Enterprise Applications", IEEE, 2008, pp. 755-762.
Pierce, "Open Community Development for Science Gateways with Apache Rave", GCE'11, Nov. 8, 2011, Seattle, WA, pp. 29-35.
Notice of Allowance for U.S. Appl. No. 14/491,483, dated Mar. 29, 2018, 8 pgs.
European Search Report issued for European Application No. 14185781.3, dated Jan. 29, 2015, 9 pages.
Citrix: "Citrix XenMobile Technology Overview: White Paper," Citrix White papers on line, <http://www.insight.com/content/dam/insight/en_US/pdfs/citrix/xenmobile-tech-overview.pdf>, Jul. 31, 2012, 14 pages.
"Citrix MDX Feature Brief," <http://ebookbrowsee.net/citrix-mdx-feature-brief-pdf-d506183473>, Jul. 21, 2013, 12 pages.
Examination Report issued for European Patent Application No. 14 185 781.3, dated Jan. 18, 2016, 6 pages.
Office Action issued for U.S. Appl. No. 14/534,623, dated Jan. 20, 2016, 19 pages.
Office Action issued for U.S. Appl. No. 14/491,386, dated Feb. 11, 2016, 33 pages.
Sobesto et al., "Are Computer Focused Crimes Impacted by System Configurations: An Empirical Study", 2012 IEEE 23rd International Symposium on Software Reliability Engineering, 2012, pp. 191-200.
Catching based on application deployed in mobile devices in mobile networks:, IPCCOM000209387D, Aug. 2, 2011, 4 pages.
Office Action issued for U.S. Appl. No. 14/491,451, dated Mar. 3, 2016, 34 pages.
Office Action issued for U.S. Appl. No. 14/534,623 dated Jun. 11, 2016, 31 pages.
Office Action issued for U.S. Appl. No. 14/491,386, dated Aug. 9, 2016, 36 pages.
Office Action issued for U.S. Appl. No. 14/491,451, dated Aug. 22, 2016, 34 pages.
Office Action issued for U.S. Appl. No. 14/534,623, dated Sep. 28, 2016, 44 pages.
Howatson "The Power of EIM Applications," OpenText Engineering, Nov. 2013, 31 pages.
Office Action for U.S. Appl. No. 14/491,492, dated Nov. 24, 2015, 21 pages.
Office Action for U.S. Appl. No. 14/491,483, dated Nov. 10, 2015, 32 pages.
GO! Enterprise, "Your Enterprise Go!es MOBILE", Apr. 11, 2012, 6 pages., Globoplc, San Jose, CA.
Pestana, et al., "LocON: A Location Based Services Platform to Improve Airport Safety", IEEEAC paper #1737, Version 2, 2011, pp. 1-10.
Office Action for U.S. Appl. No. 14/491,492, dated May 13, 2016, 20 pages.

(56) References Cited

OTHER PUBLICATIONS

Office Action for U.S. Appl. No. 14/491,483, dated Jun. 9, 2016, 28 pages.
Office Action for U.S. Appl. No. 14/491,492, dated Sep. 1, 2016, 25 pages.
Meily "Secure Mobile Productivity in a BYOD World: Box for Good Technology," retrieved from https://www.box.com/blog/secure-mobile-productivity-in-a-byod-world-box-for-good-technology/, Dec. 11, 2012, 2 pages.
Office Action for U.S. Appl. No. 14/491,483, dated Sep. 21, 2016, 33 pages.
Preiss, "User-Centered Development of a Wireless Sensor Network-Based Asset Management System for Mobile Measurement Devices", Conference: Smart SysTech 2012, Jun. 12-13, 2012, Germany, 7 pages.
Martens, "A Declarative Approach to a User-Centric Markup Language for Location-Based Services", Mobility 2009, Sep. 2-4, 2009, Nice France, 7 pages.
Notice of Allowance issued for European Patent Application No. 14185781.3, dated Jan. 24, 2017, 53 pages.
Office Action issued for U.S. Appl. No. 14/491,386, dated Jan. 30, 2017, 43 pages.
Medjahed, "Business-to-business interactions: issues and enabling technologies", The VLDB Journal, 2003, pp. 59-85.
Li, "Security Considerations for Workflow Systems", 2000, IEEE, pp. 655- 668.
Oracle White Paper, "Securing SOA and Web Services with Oracle Enterprise Gateway", Apr. 2011, 22 pages.
Office Action issued for U.S. Appl. No. 14/491,492, dated Feb. 6, 2017, 31 pages.
Luo, "Risk Based Mobile Access Control (RiBMAC) Policy Framework", The 2011 Military Communications Conference—Track 3—Cyber Security and Network Operations, 2011, pp. 1448-1453.
Lennon, "Bring Your Own Device (BYOD) with Cloud 4 Education", SPLASH'12, Oct. 19-26, 2012, pp. 171-179.
Office Action issued for U.S. Appl. No. 14/491,483, dated Feb. 6, 2017, 37 pages.
Notice of Allowance issued for U.S. Appl. No. 14/534,623, dated Feb. 24, 2017 7 pages.
Notice of Allowance issued for U.S. Appl. No. 14/491,451, dated Feb. 28, 2017, 11 pages.
Suri, "Dynamic Service-oriented Architectures for Tactical Edge Networks", WEWST 2009, Nov. 9, 2009, Eindhoven, Netherlands, pp. 3-10.
David, "Everything You Always Wanted to Know About Synchronization but Were Afraid to Ask", SOSP'13, Nov. 3-6, 2013, Farmington, Pennsylvania, pp. 33-48.
Genbrugge, "Interval Simulation: Raising the Level of Abstraction in Architectural Simulation", IEEE, 2009, 12 pages.
Kuroda, "A Study of Autonomous Data Coherency Protocol for Mobile Devices", IEEE, 1999, pp. 250-256.
Prosser, "In-Depth: Container Fields", FileMaker Community, Apr. 3, 2014, 51 pages.
Notice of Allowance issued for U.S. Appl. No. 14/491,451, dated Apr. 25, 2017, 10 pages.
Leach et al., "The Architecture of an Integrated Local Network," IEEE Journal on Selected Areas in Communications, vol. Sac-1, No. 5, Nov. 1983 pp. 842-857.
Sherr et al., "Application Containers Without Virtual Machines," Dept. Of Computer and Information Science, University of Pennsylvania, 2009, pp. 39-41.
Office Action issued for U.S. Appl. No. 14/491,483, dated Jun. 19, 2017, 35 pages.
"Application Note—Using Tenor Behind a Firewall/NAT," Quintum Tech Assistance Center, Eatontown, NJ, Mar. 16, 2005, 8 pages.
"FortiMail Install Guide," Version 3.0 MR2, Fortiner, Dec. 12, 2007, 108 pages.
Office Action issued for U.S. Appl. No. 14/491,386, dated Jun. 28, 2017, 43 pages.
Office Action issued for U.S. Appl. No. 14/491,492, dated Jul. 6, 2017, 31 pages.
Office Action issued for U.S. Appl. No. 15/595,481, dated Jul. 31, 2017, 13 pages.
Whitmore, "A Method for Designing Secure Solutions," IBM System Journal, vol. 40, No. 3, 2001.
Recker et al., "A Preferable Look—APL in Window-Based Environments," 1990, ACM, pp. 312-321.
Office Action issued for U.S. Appl. No. 15/653,017, dated Aug. 25, 2017, 12 pages.
Office Action issued for U.S. Appl. No. 14/491,386, dated Oct. 11, 2017, 58 pages.
Notice of Allowance for U.S. Appl. No. 14/491,483, dated May 7, 2018, 8 pgs.
Office Action for U.S. Appl. No. 15/340,695, dated Jun. 4, 2018, 19 pgs.
Office Action for U.S. Appl. No. 15/960,000, dated Jun. 18, 2018, 19 pgs.
Daenen, Koen et al, "The Personal Internet," Bell Labs Technical Journal, 15, No. 1 2010, pp. 3-21.
Insley, Joseph A., et al., "Using Dynamic Accounts to Enable Access to Advanced Resources Through Science Gateways," In Proceedings of the 5th Grid Computing Environments Workshop, ACM, 2009, 6 pgs.
Office Action for U.S. Appl. No. 15/595,481, dated Jul. 5, 2018, 40 pgs.
Notice of Allowance for U.S. Appl. No. 14/491,483, dated Sep. 4, 2018, 14 pgs.
Notice of Allowance for U.S. Appl. No. 14/491,492, dated Oct. 26, 2018, 8 pgs.
Notice of Allowance for U.S. Appl. No. 14/491,492, dated Sep. 24, 2018, 10 pgs.
Notice of Allowance for U.S. Appl. No. 15/653,017, dated Sep. 24, 2018, 4 pgs.
Office Action for U.S. Appl. No. 15/442,302, dated Oct. 2, 2018, 10 pgs.
Zhang, Xinwen, et al., "Securing Elastic Applications on Mobile Devices for Cloud Computing," Proceedings of the first ACM Cloud Computing Security Workshop, CCSW 2009, Chicago, IL, USA, Nov. 13, 2009, 8 pgs.
Office Action for U.S. Appl. No. 15/340,695, dated Nov. 26, 2018, 19 pgs.
Notice of Allowance for U.S. Appl. No. 15/595,481, dated Nov. 30, 2018, 10 pgs.
Jones, Matthew B., et al., "Managing Scientific Metadata," IEEE Internet Computing 5, No. 5, 2001, 59-68.
Molva, Refik et al., "Application Access Control at Network Level," in Proceedings of the 2nd ACM Conference on Computer and Communications Security, 94, pp. 219-228.
Office Action for U.S. Appl. No. 15/960,000, Jan. 18, 2019, 50 pgs.
Notice of Allowance for U.S. Appl. No. 15/595,481, dated Mar. 5, 2019, 9 pgs.
Notice of Allowance for U.S. Appl. No. 15/653,017, dated Mar. 8, 2019, 6 pgs.
Office Action for U.S. Appl. No. 15/960,000, dated May 2, 2019, 43 pgs.
Office Action for U.S. Appl. No. 14/340,695, dated May 17, 2019, 23 pgs.
Office Action for U.S. Appl. No. 15/442,302, dated Jul. 3, 2019, 12 pgs.
Office Action for U.S. Appl. No. 16/371,852, dated Aug. 1, 2019, 14 pgs.
Office Action for U.S. Appl. No. 16/371,812, dated Aug. 27, 2019, 16 pgs.
Copeland, Wes et al., "A Managed Security Environment for Enterprise iPhones," Proceedings of the 50th Annual Southeast Regional Conference, ACM, Mar. 29-31, 2012, pp. 136-141.
Jaramillo, David et al., "A secure extensible container for hybrid mobile applications," 2013 Proceedings of IEEE Southeastcon, IEEE, Apr. 4-7, 2013, pp. 1-5.

(56) References Cited

OTHER PUBLICATIONS

Office Action for U.S. Appl. No. 15/960,000, dated Sep. 12, 2019, 54 pgs.

* cited by examiner

STREAMLINED FAST AND EFFICIENT APPLICATION BUILDING AND CUSTOMIZATION SYSTEMS AND METHODS

CROSS-REFERENCE TO RELATED APPLICATIONS

This is a continuation of, and claims a benefit of priority from U.S. patent application Ser. No. 15/340,695, filed Nov. 1, 2016, entitled "STREAMLINED FAST AND EFFICIENT APPLICATION BUILDING AND CUSTOMIZATION SYSTEMS AND METHODS," which is a conversion of, and claims a benefit of priority from U.S. Provisional Application No. 62/250,175, filed Nov. 3, 2015, entitled "GATEWAY CLIENT BUILDING AND CUSTOMIZATION SYSTEMS AND METHODS," all of which are fully incorporated by reference herein in their entireties.

TECHNICAL FIELD

This disclosure relates generally to enterprise application development and management. More particularly, this disclosure relates to systems, methods, and computer program products for building and customizing client software for an application gateway in a streamlined, fast, and efficient manner that results in improved user experience.

BACKGROUND OF THE RELATED ART

Today, various computer technologies are used within enterprises and companies alike. In this disclosure, "enterprise" generally refers to an entity such as a company, an organization, or a government agency, rather than individual end users. These technologies produce massive amounts of content, including scanned documents, faxes, emails, search results, office documents, social media content, etc. Enterprise applications, also known as enterprise application software (EAS), refer to a class of computer software used to satisfy such technological needs of an enterprise. To this end, enterprise applications are considered highly complex software systems. They are data-centric, user-friendly, and must meet stringent requirements for security, administration, and maintenance. Examples of enterprise applications may include enterprise resource planning software; groupware systems; e-commerce software such as back-office systems; or standalone applications.

Scalable, distributed, component-based, and often mission-critical, enterprise applications may be deployed on a variety of platforms across enterprise networks, intranets, or the Internet. As enterprises have similar departments and systems in common, enterprise applications are often available as a suite of customizable programs. Generally, the complexity of enterprise applications requires specialist capabilities and specific knowledge to develop and deploy them.

For example, developing an enterprise application for a mobile operating system developed by Apple Inc. (referred to herein as "iOS") requires knowledge of Apple's development tools, coding environment, and their guidelines. Furthermore, some programming languages (e.g., Swift) for Apple-based platforms (e.g., iOS, OS X, watchOS, and tvOS) are made specifically for iOS and Macs and are required to run on computers with iOS 7 or macOS 10.9 or higher.

An enterprise application thus developed by an application developer for an enterprise to run on a mobile device (e.g., a smart phone that runs on a mobile operating system such as iOS or Android, which is another popular mobile operating system developed by Google) may be submitted by the application developer to a third-party digital distribution platform such as the App Store developed and maintained by Apple Inc. for review, approval, and publication. For applications that are developed with Apple's iOS software development kit (SDK), this review process currently takes an average of two days, from submission to publication (i.e., made available by Apple in the App Store). The App Store allows end users to browse and download applications. From the perspective of an enterprise, the App Store is a third-party application that can act as a generic portal (i.e., access to the App Store is generally open to the public and not specific to the enterprise) through which end users of the enterprise can access, download, and install enterprise-approved enterprise applications. Other third-party digital distribution platforms on the Internet operate in a similar way.

Thus, traditionally, enterprise application development and deployment involve third-party digital distribution platforms on the Internet. However, an enterprise generally has no control over the review process of such a third-party digital distribution platform.

SUMMARY OF THE DISCLOSURE

An object of this disclosure is to streamline enterprise application development and deployment processes such that an enterprise application can be quickly and efficiently developed and deployed to enterprise end users. Another object of this disclosure is to provide a solution for an authorized user of an enterprise to build a custom variation or variations of an enterprise application with as little hardware as a keyboard and a networked computer running a browser application. Yet another object of this disclosure is to provide a solution for building a custom variation or variations of an enterprise application in a fraction of an hour.

According to embodiments disclosed herein, these and other objects may be achieved by implementing a particular method disclosed herein. The method may include receiving, by a system embodied on at least one server machine via a user interface running on a computing device communicatively connected to the system, a request to build a custom application specific to an operating system platform. The method may further comprising preparing a build request containing user-provided configuration information for the custom application; communicating the build request to a bonding client running on a workstation that is specific to the operating system platform; building the custom application specific to the operating system platform on the workstation, the building performed by the bonding client running on the workstation, the building comprising executing build scripts with the user-provided configuration information; and, instead of submitting the custom application to a third-party digital distribution platform, persisting the custom application in a storage location accessible by the system. The system may send the computing device a response containing a link to the storage location of the custom application. A user on the computing device may then use the link to download the custom application and install it on the computing device. The user may also forward the link to other user(s) who can then also download and install the custom application on their devices.

In some embodiments, the method may further comprise determining whether the custom application is to be built in a single application mode or a multi-application mode. This can be a decision that is made by the system based on a user-configurable setting. For example, the build request may contain a user-specified setting that the custom application is to be built to avow an end user to access multiple applications via the custom application. If so, the bonding client running on the workstation that is specific to the operating system platform operates to build the custom application using scripts associated with the multi-application mode.

In some embodiments, the method may further comprise determining whether the custom application is to be built with custom branding assets or default image assets. This can be a decision that is made by the system based on a user-configurable setting. For example, the build request may contain a user-specified setting that the custom application is to be built with custom branding assets such as an icon, a logo, or a launch screen for an enterprise. Otherwise, the custom application may be built with default image assets. The decision as to whether to build the custom application with or without custom branding assets may be made in either the single application mode or the multi-application mode.

In some embodiments, the system may comprise an application gateway. The application gateway may comprise a web access service and a client packager, also referred to herein as a bonding service. The web access service and the bonding service may be part of a plurality of client services provided by the application gateway to computing devices communicatively connected to the application gateway over a network. The web access service may be accessible by each of the computing devices via a browser application. For example, the web access service may provide a packager web client that runs within a browser application on a computing device communicatively connected to the application gateway. Responsive to a request from a user to build a custom application, the packager web client may obtain or otherwise collect information of the requested custom application from the user, prepare a build request with user-provided information, and submit the build request through the web access service of the application gateway. The build request is then communicated to the bonding client via the web access service and the client packager of the application gateway.

In some embodiments, the custom application is a user-customized variation of an application gateway client. The user-customized variation may include custom branding assets specific to an enterprise. Furthermore, in some embodiments, the user-customized variation may also include a mobile device management (MDM) component. The MDM component may be part of a MDM solution used by the enterprise to control enterprise applications running on their mobile devices. Other customized variations may also be possible. In some embodiments, the custom application can be built in the single application mode and deployed as an application gateway client running on in a desktop computing environment (e.g., a single use desktop client). As an example, an electronic document management application (e.g., eDOCS) available from OpenText™ can be implemented as a single use desktop client of an application gateway disclosed herein.

One embodiment comprises a system comprising at least one processor and at least one non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The inventive subject matter and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful.

Figure 1:
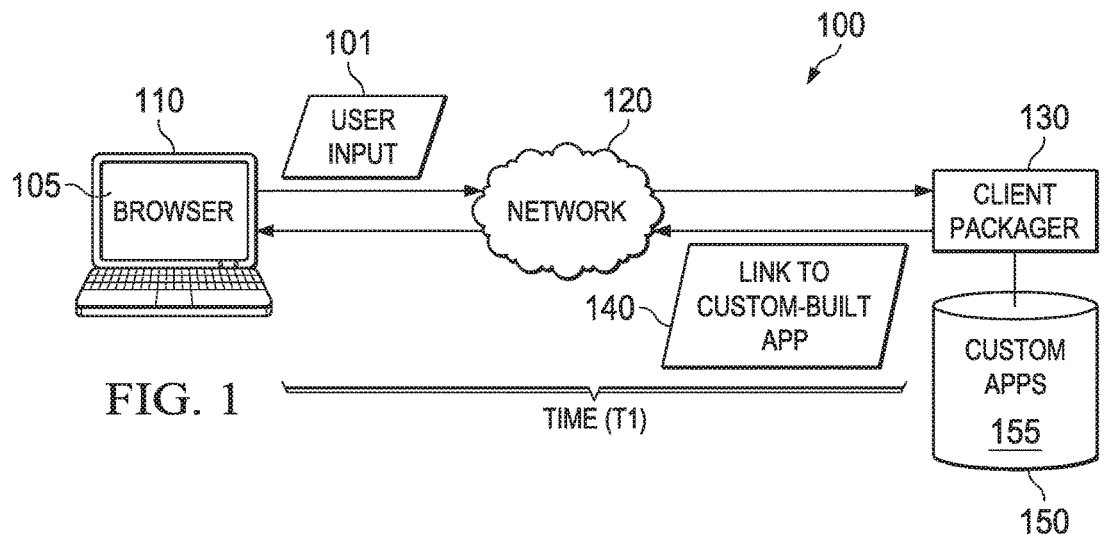
FIG. 1 depicts a diagrammatic representation of an example of an enterprise application development and deployment system according to some embodiments.

As discussed above, an object of this disclosure is to streamline enterprise application development and deployment processes such that an enterprise application can be quickly and efficiently developed and deployed to enterprise end users. This object can be achieved in a new streamlined fast and efficient application building and customization system such as system 100 illustrated in FIG. 1. System 100 implements a technical solution for an authorized user of an enterprise to build a custom variation or variations of an enterprise application with as little hardware as networked computer 110 running browser application 105. In this example, networked computer 110 is communicatively connected to client packager 130 over network 120. Network 120 can be any computer network known to those skilled in the art and may include wired, wireless, private, or public networks, including the Internet.

As explained further below, client packager 130 may provide a web-based interface that can be run within browser application 105. Via the web-based interface, the user may request client packager 130 to build a custom application for the enterprise. This custom application may be a variation of an enterprise application provided by an application development platform on which client packager 130 is run. The user can also provide customization details about the custom application to client packager 130. User input 101 containing these customization details is communicated to client packager 130 over network 120. In turn, client packager 130 builds the requested custom application using user input 101 and stores the custom application in application repository 150. The custom application thus built by client packager 130 may reside at a particular storage location in application repository 150. Client packager 130 prepares and sends response 140 that contains a link to the particular storage location where the requested custom application resides. The response can be in one or more suitable forms, for instance, an email, a message, a notification, etc. The user can use the link in response 140 to retrieve/download the custom application built by client packager 130 and install it on networked computer 110. The whole process—from sending a request to client packager 130 via browser application 105 to receiving response 140—takes a fraction of an hour (T1). In some cases, T1 can be as little as about five minutes or less than 10% of an hour. This streamlined approach provides a significant reduction in time and efficiency over the traditional application development and deployment cycle.

Figure 2:
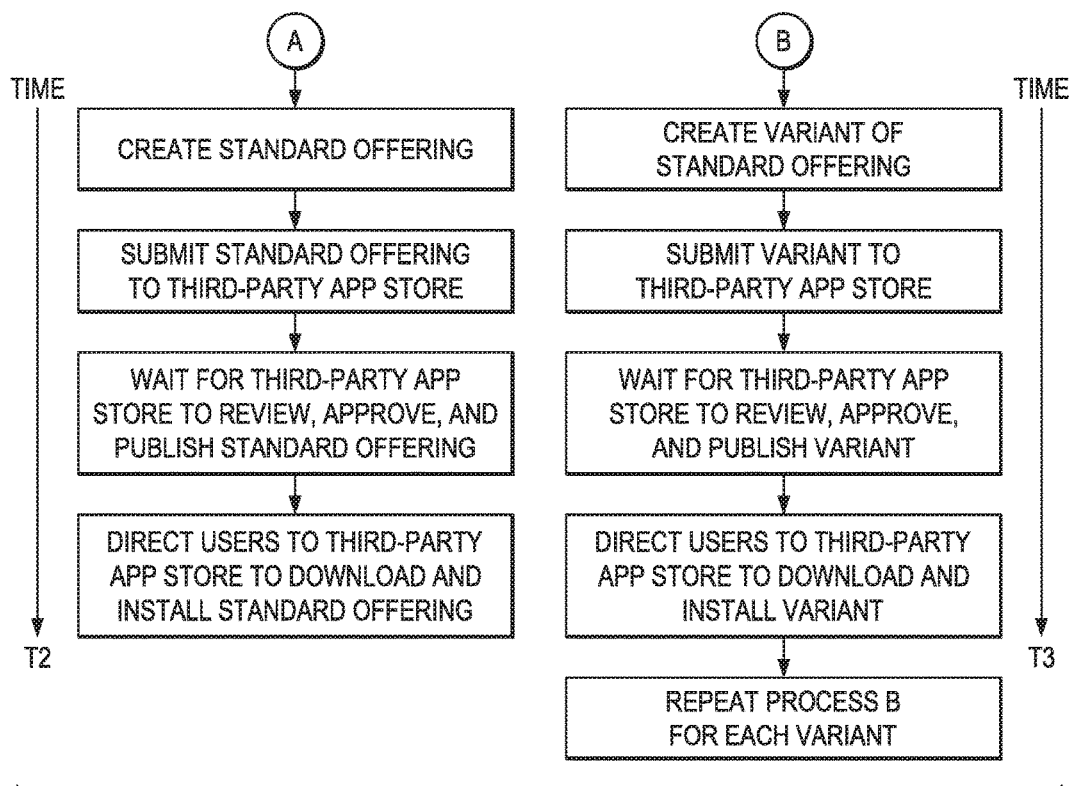
FIG. 2 shows general processes for developing and deploying a custom application that is a variant of a standard offering.

As illustrated in FIG. 2, in today's application development and deployment cycle, an application developer may develop or create a standard version of an application ("standard offering"), submit the standard offering to a third-party digital distribution platform such as the App Store discussed above, wait for the operator of the App Store to review, approve, and publish the standard offering in the App Store, and then direct end users to the App Store to download and install the standard offering on their devices. This process (A) can take months, if not weeks, and the third-party review process alone currently takes about two days.

To create a variant of the standard offering (e.g., an enterprise version of the standard offering), the application developer may again create the variant, submit the variant to the App Store, wait for the operator of the App Store to review, approve, and publish the variant in the App Store, and then direct enterprise users to the App Store to download and install the variant on their devices. Like Process A, this process (B) can take months, if not weeks, and the third-party review process is outside of the control of the enterprise and any of its developers. Process B can be repeated for each desired variant of the standard offering. If each Process B takes a certain amount of time (T3), each T3 taking multiple weeks or months, then 5 variants can take 5 times T3 to complete. Embodiments can streamline application development and deployment processes in an intelligent and effective manner, making them significantly more efficient and faster than existing application development and deployment solutions such that T1 is a mere fraction of T3.

Figure 3:
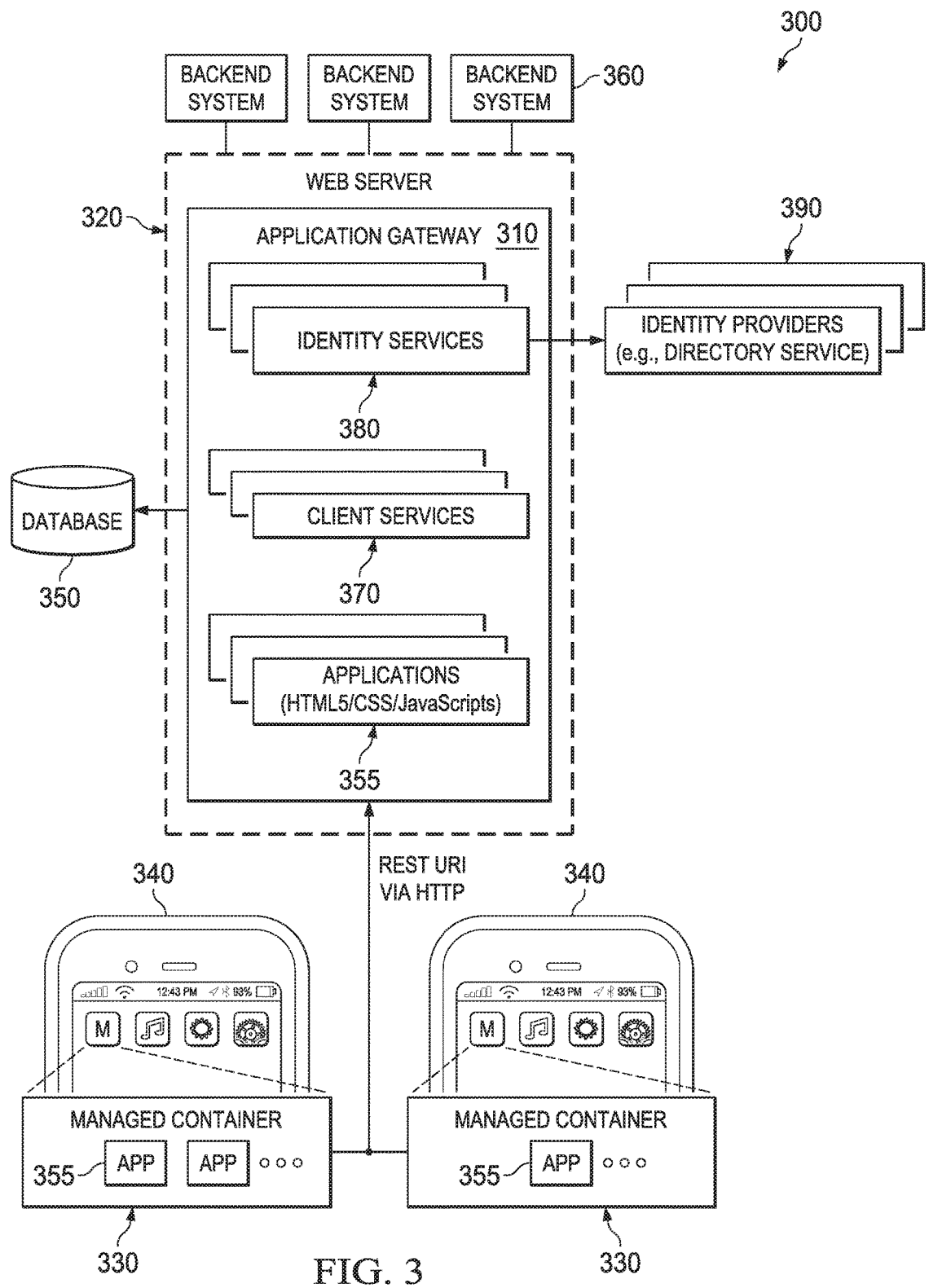
FIG. 3 depicts a diagrammatic representation of an example of an enterprise application development, deployment, and management platform according to some embodiments.

As illustrated in FIG. 3, application gateway 310 refers to the server-side component of enterprise application development, deployment, and management platform (referred to herein as "platform") 300. AppWorks (available from Open Text) is a non-limiting example of platform 300.

In some embodiments, Application gateway 310 may be embodied on one or more server machines. In the example illustrated, application gateway 310 is implemented as part of web server 320. Skilled artisans appreciate that web servers generally reside in front (or outside) of a firewall that protects complex enterprise-class systems such as backend systems 360 shown in FIG. 3. Examples of backend systems 360 may include a content server, OpenText Enterprise Information Management (EIM) Suite, etc.

The client-side component is represented by managed containers 330 in the example of FIG. 3. In this disclosure, a managed container refers to a special computer program that can function as a client of the application gateway (and hence is also referred to herein as application gateway client software or AG clients).

Managed containers 330 may be embodied on computing devices 340. Computing devices 340 may run on various operating systems including, but not limited to, mobile operation systems such as iOS, Android, etc.

In some embodiments, application gateway applications (or AG apps) 355 may refer to particular enterprise applications that are written in standard web technologies such as HyperText Markup Language Version 5 (HTML5), JavaScript, Cascading Style Sheets Level 3 specification (CSS3), etc. AG apps 355 may be hosted and/or required by backend systems 360.

As an example, managed container 330 may provide a secure shell for AG app 355 received from application gateway 310, store AG app 355 and data associated with AG app 355 in a managed cache of managed container 330, and control the managed cache in accordance with a set of rules propagated from backend system 360 to managed container 330 via application gateway 310. All or some of the set of rules may reside on computing device 340, backend system 360, application gateway 310, or a combination thereof. More details on enterprise application development, deployment, and management platform 300 can be found in U.S. Patent Application Publication No. 2015/0088934, published Mar. 26, 2015, entitled "HOSTED APPLICATION GATEWAY ARCHITECTURE WITH MULTI-LEVEL SECURITY POLICY AND RULE PROMULGATIONS," which is fully incorporated by reference herein.

The above-referenced U.S. Patent Application Publication No. 2015/0088934 (U.S. patent application Ser. No. 14/534,623, filed Nov. 6, 2014, referred to hereinafter as the '623 application) is a continuation-in-part of U.S. patent application Ser. No. 14/491,386, filed Sep. 19, 2014, Publication No. 2015/0089224, entitled "APPLICATION GATEWAY ARCHITECTURE WITH MULTI-LEVEL SECURITY POLICY AND RULE PROMULGATIONS" (referred to hereinafter as the '386 application) which is a conversion of, and claims a benefit of priority under 35 U.S.C. § 119 from U.S. Provisional Application No. 61/880,481, filed Sep. 20, 2013 (referred to hereinafter as the '481 application). The '623 application incorporates the '386 application and the '481 application by reference. The above-referenced applications describe embodiments of desktop client devices implementing managed containers such as managed container 330 that interact with and that receive services from an application gateway such as application gateway 310. Accordingly, in some embodiments, computing device 340 can include desktop computing devices and managed containers 330 can include those built using a client packager disclosed herein and deployed as desktop clients of an application gateway, as described in the referenced applications.

In some embodiments, application gateway 310 provides a framework that allows enterprise customers and affiliates connect to backend systems 360. In some embodiments, all network traffic to and from backend systems 360 goes through application gateway 310 which, as discussed above, may reside in front (or outside) of the firewall that protects backend systems 360. This is possible because all managed containers 330 can be securely managed via application gateway 310.

In some embodiments, application gateway 310 manages a plurality of client services 370 and AG apps 355 deployed in platform 300. In some embodiments, client services 370 are RESTful services and can support various authentication methods through identity services 380. In some embodiments, client identities may be authenticated using identity service providers 390. In one embodiment, identity service providers 390 may include the OpenText Directory Services (OTDS).

In some embodiments, application gateway 310 may utilize client services 370 to communicate with backend system 360. Customers of application gateway 310 can also create their own services to enable AG applications 355 running inside managed containers (AG clients) 330 to connect to their own backend systems.

In some embodiments, client services 370 can include software modules that are written in Java and that connect to backend systems 360. Client services connecting to third-party networked computer systems are also possible.

In some embodiments, each client service 370 can expose an application programming interface (API) that can run on (e.g., is compatible with) platform 300 and that can be consumed by AG apps 355 that run inside AG clients 330. Non-limiting examples of client services 370 may include the following:

Assignments Service (Content Server)
Workflow Service (Content Server)
Favorites Service (Content Server)
Content Service (Content Server, Document Management)
Document Conversion Service (Content Server, ECM Everywhere)
Web Access Service (Common Header)
Insight (Analytics)

Web Access Service can be a single entry point for managing and accessing applications that require running in a browser. In some embodiments, each client service 370 is accompanied with a web application for the configuration of the client service itself.

As discussed above, AG apps 355 can be HTML 5, CSS, and/or JavaScript applications stored in an application repository such as database 350. When deployed (e.g., by application gateway 310), they run within AG client 330, if web access is not required. AG clients 330 are native applications (native to each of computing devices 340) that can host and launch AG apps 355. AG clients 330 can do so by communicating with application gateway 310 via client services 370 at runtime to download and install AG apps 355 into computing devices 340. Because they are written in standard web technologies, AG apps 355 are by definition cross-platform (or platform-independent), written once, and available to multiple users on various types of computing devices such as mobile devices, smart phones, tablets, etc. as well as through web browsers and desktop computers running on various operating systems, all from a single code base. By contrast, AG clients 330 are operating system platform-specific (e.g., on mobile devices and/or desktop computing devices). Non-limiting examples of operating system platforms on which AG clients 330 may run may include iOS, Android, BlackBerry, etc.

In some embodiments, AG clients 330 are managed through an administration tool of application gateway 310 and can be rebranded, each with its own application name, icon, and digital assets such as graphics, color scheme, and certificate. Within application gateway 310, the administration tool can be used to push AG apps 355 to a particular AG client 330, based on the name of the client software. This means that not all AG clients 330 may display the same AG apps 355, even when they connect to the same server. Also, AG apps 355 can be made available to certain groups of users or individually named users.

Figure 4:
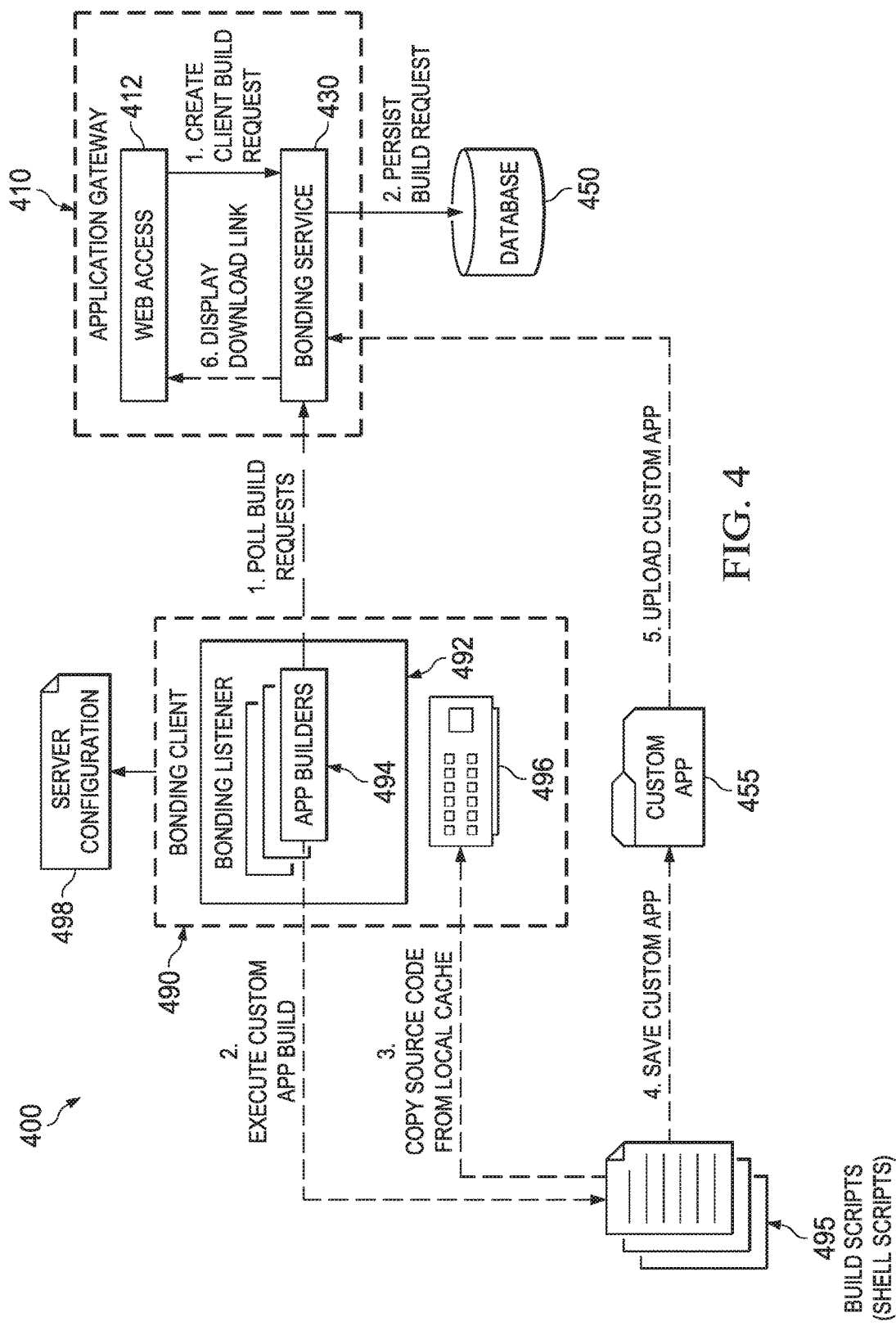
FIG. 4 depicts a diagrammatic representation of another example of an enterprise application development and deployment system according to some embodiments.

Embodiments disclosed herein provide a new tool referred to herein as the "Client Packager" that enables customers of application gateway 310 and affiliates to rebrand AG clients 330 or any variant of a standard offering of platform 300. FIG. 4 depicts a diagrammatic representation of an example of Client Packager 400 built on AppWorks platform (which is an example of platform 300 described above).

In the example illustrated, a user (e.g., an administrator of an enterprise) may log in to an administration tool of application gateway 410 and select a function "Client Build" provided by the administration tool to build a custom version of a client program (e.g., managed container 330 of FIG. 3) of application gateway 410. In one embodiment, bonding Service 430 can be a RESTful AppWorks service, deployed in the AppWorks Gateway, to coordinate client build requests. Client build requests are created in an accompanied web application which launches in web access service 412, for instance, AppWorks Web Access service. Once data is collected from a user who requests a client build, they are stored in database 450 as a configuration file for that client build. In one embodiment, this can be an XML file. There can be one client build configuration file per a build request. Bonding client 490 can retrieve the stored build request with the associated artifacts from database 450.

The user will also see any work that they created (e.g., to re-run or modify, etc.), so the data can again be pulled from the database.

In some embodiments, web access service 412 can be used to launch bonding service web application 430 to create a build request. The bonding service web application provides the user interface (UI) for users to enter details to create a client build request.

In some embodiments, examples of build properties that may be specified via the UI may include, but are not limited to:

a. Runtime Name—Specifies a name to build a client deployment package.
b. App Name—Specifies a display name to build a client deployment package.
c. App Version—Specifies a version number to build a client deployment package.
d. Wrapping SDK—Optional. Specifies a Mobile Device Management (MDM) SDK to wrap the client deployment package. Default value is "None" for not applying MDM wrapping. In one embodiment, this property is enabled if the "iOS Enterprise" or "Android" target is selected.
e. Server Address—Optional. Specifies an application gateway server universal resource locator (URL) for the client to bypass user profile creation. The bonding client (e.g., bonding client 490) created client allows users to create a profile at runtime if no Server Address is specified.
f. Targets—Specifies one of the following values for the target build:
  i. iOS App Store—Create an iOS deployment package for iOS app store submission.
  ii. iOS Enterprise—Create an iOS deployment package for enterprise distribution.
  iii. Android—Create an Android deployment package.
g. Code Versions—Specify the source code version to build a client.

Examples of certificates and identifiers that may be specified via the UI may include, but are not limited to:
a. Provisioning Profile—Specifies the iOS Provisioning Profile for the iOS deployment package.
b. Application Identifier—Specifies the application identifier for the iOS deployment package. In one embodiment, an iOS application identifier is in the following format: {bundle prefix}.{bundle id} where {bundle.prefix} is the iOS developer team ID and {bundle.id} is the bundle identifier for iOS distribution.
c. Signing Identity—Specifies the Common Name (CN) in the iOS deployment package signing certificate.
d. Certificates—Specifies the iOS deployment package signing certificate.
e. Certificate Password—Specifies the iOS deployment package signing certificate password.

Examples of assets that may be specified via the UI may include, but are not limited to: Assets
a. UI Colours
b. iOS Icons
c. iOS Logo and Launch Screen
d. Android Assets Each client build request is persisted in database 450 using, for instance, the Java Persistence API. AppWorks services can optionally have server-side web applications via web access service 412.

In some embodiments, bonding client 490 refers to a multi-threaded Java console application installed and runs in a Mac OSX workstation. Bonding client 490 is run in a Mac OSX workstation for the compilation of the AppWorks iOS Client, since Apple iOS applications can only be compiled in Apple hardware.

On start-up, bonding client 490 loads a property file (server configuration 498) to configure its runtime behavior and create the specified number of builder threads to poll client build requests created in application gateway 410. An example of a property file (bonding-listener.properties) may specify the following property keys:

build.command.init—Specifies the command to initialize a new client build.
build.command.execute—Specifies the command to execute a client build
build.command.clean—Specifies the command to clean up after a client build is completed.
key—Specifies the trusted server key created in the application gateway for the bonding client
server.url—Specifies the application gateway base URL.
polling.period.ms—Specifies a value in millisecond to poll the bonding service for build requests. Default to 20000.
build.timeout—Specifies a period in millisecond to terminate a client build. Default to 600000.
build.thread—Specifies the number of builder threads to process client build requests. Default to 8.
assets.zip.path—Specifies the local path to place the download assets.zip file downloaded from the bonding service.
results.ios.path—Specifies the path where an iOS App Store build zip package will be created.
results.ipa.path—Specifies the path where the iOS application archive file for the "iOS App Store" build is created.
results.ent.path—Specifies the path where the iOS application archive file for the "iOS Enterprise" build is created.

The application building process is controlled by executing build scripts 495 (e.g., OSX shell scripts) to create the selected version of the client application from a local source code cache (e.g., local cache 496).

To run build scripts 495, bonding listener 492 may instantiate multiple AG client application builders (threads) 494. As a non-limiting example, bonding listener 492 of bonding client 490 (installed on the Mac OSX workstation) may include the following:

bonding-client.jar—a bonding client Java archive file.
bonding-client.log—a bonding client runtime log file.
build.sh—This shell script is executed to create the client build.
clean.sh—This shell script is executed to clean up the "post_bonding" folder when a client build is completed.
config.sh—This shell script is invoked by other build scripts to configure the environment to create a client build.
init.sh—This shell script is executed first to initialize a client build.
post_bonding—The specified version of the client source code is copied to the post_bonding sub-directory to execute the client build.
pre_bonding—The pre_bonding sub-directory is used as a local source code cache for the different versions of the clients (e.g., managed container 330 of FIG. 3).

Successfully created client deployment package 455 is then uploaded to application gateway 410 via bonding service 430.

Figure 5:
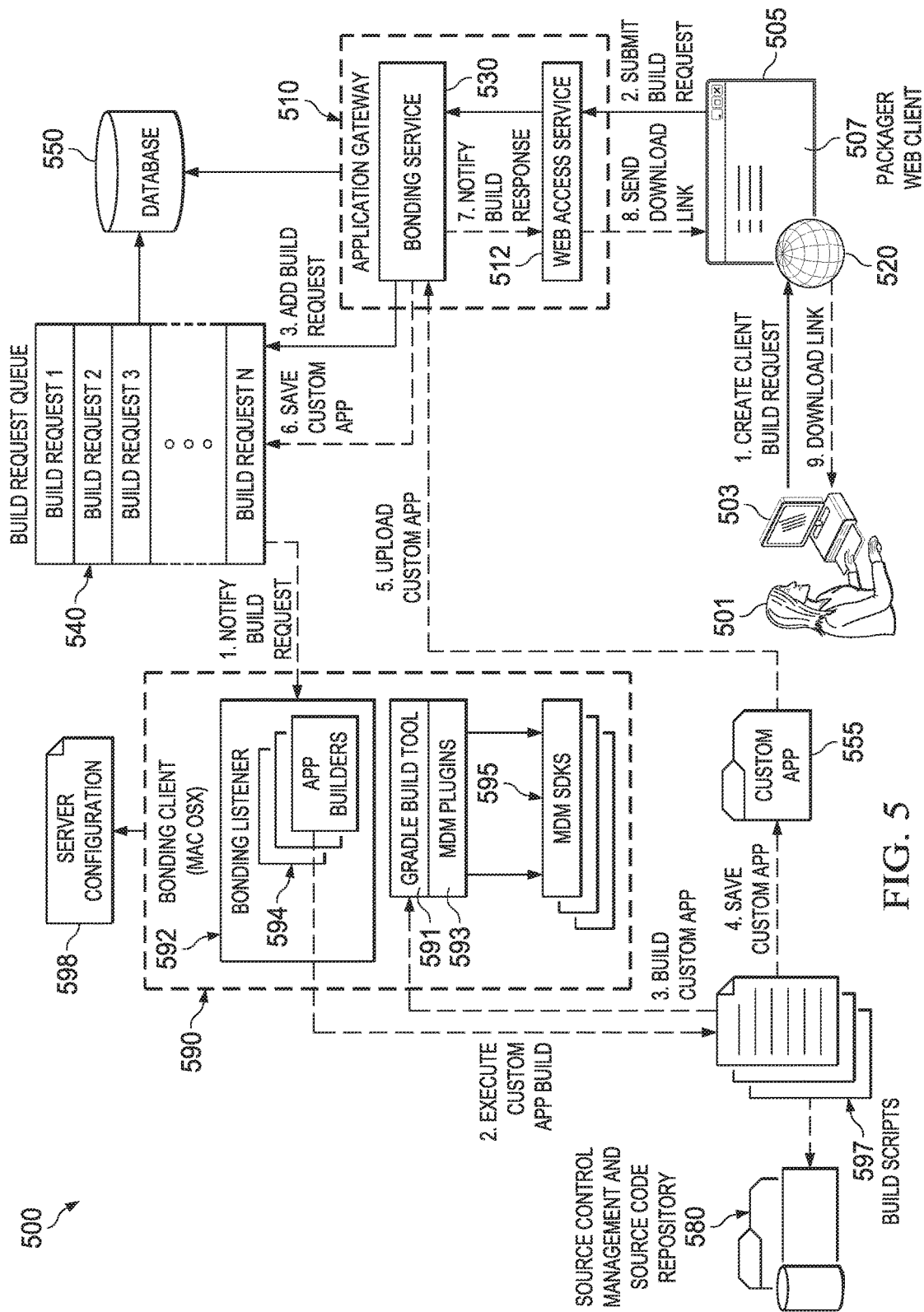
FIG. 5 depicts a diagrammatic representation of yet another example of an enterprise application development and deployment system according to some embodiments.

FIG. 5 depicts a diagrammatic representation of another example of Client Packager 500 built on AppWorks platform (which is an example of platform 300 described above with reference to FIG. 3). Client Packager 500 differs from Client Packager 400 described above with reference to FIG. 4 as follows:

Single Application and Multi-Application Client Build—enterprise-approved applications are stored in database 550. At run time, these applications can be pushed via application gateway 510 down to user devices (e.g., user device 503) according to the user's (e.g., user 501) permissions. The application gateway client applications (also referred to herein as AG clients) built by Client Packager 500 are managed containers for the enterprise-approved applications that users are allowed to access. Client Packager 500 may allow AG clients be built in the single application mode or multi-application mode. In the multi-application mode, end users can select the enterprise-approved applications they wish to run after authentication. In the single application mode, end users are taken directly to the configured applications after authentication in the AG client.

Build Request Queue—In some embodiments, build request queue 540 can be a Java Message Service (JMS) message queue, such as ActiveMQ, used by application gateway 510 to queue client build requests generated by packager web client 507. Packager web client 507 may be provided via web access service 512 over network 520 and accessible by users (e.g., user 501) via browser 505 running on their devices (e.g., user device 503). As an example, responsive to a request from user 501 to create/build a custom application, packager web client 507 may obtain or otherwise collect information (e.g., configuration details such as the name of the requested custom application and/or branding information, if desired) from the user, prepare a build request with user-provided information, and submit the build request through web access service 512 of application gateway 510, as illustrated in FIG. 5. The build request is then communicated from web access service 512 to bonding service 530 which then adds the build request to build request queue 540 serviced by bonding client 590. In some embodiments, build request queue 540 can be configured using a point-to-point channel to ensure that only one bonding client 590 receives a client build request.

Bonding Client Running as an OSX Daemon—In some embodiments, a Java service wrapper can be used to run bonding client 590 as an OSX daemon to avoid any manual re-start after reboot. Bonding client 590 may comprise bonding listener 592 and AG client application builders 594 similar to bonding listener 492 and AG client application builders 494 described above. Furthermore, server configuration 598 for bonding client 590 may be similar to server configuration 498 for bonding client 490 described above.

Gradle Build Scripts—In some embodiments, Client Packager 500 may use Gradle build scripts 597 as opposed to the OSX shell scripts described above. The Gradle Domain Specific Language (DSL) enables the build logics to move out of the bonding client source code.

Gradle Custom Plugin for MDM Support—In some embodiments, Client Packager 500 may use Gradle custom plugin 593, via Gradle build tool 591, to avoid having to edit build scripts 597 for new mobile device management (MDM) software development kit (SDK) support 595. In some embodiments, MDM SDK support 595 can be implemented as custom tasks in custom plugin 593. In some embodiments, custom plugin 593 can be implemented in the Gradle Groovy language to allow Gradle to compile, test, and make the custom plugin available in build scripts 597.

Retrieve AG Client Source Code from Source Code repository 580—In some embodiments, bonding client 590 may synchronize the local working copy of the AG client source code at a specified interval.

Successfully created client deployment package 555 (a customized version of the AG client application, referred to herein as "custom app") is then uploaded to application gateway 510 via bonding service 530.

When deployed, custom app 555 can act as a multi-application managed container for application gateway 510 and can host any number of enterprise-approved applications deployed at application gateway 510. In some embodiments, however, custom app 555 may be configured to hold a single application at most and hides all its multi-application features. Building custom app 555 to operate in a single-application mode, as opposed to multi-application mode, can entail utilizing user input received via web access service 512 illustrated in FIG. 5. The single-application mode can configure code for custom app 555 to be dedicated to a single enterprise-approved application when run on a user device. When custom app 555 is configured in this way (at the build stage by Client Packager 500), the end user of the enterprise-approved application is unaware that custom app 555 could host multiple applications. Advantageously, the single application can be branded within custom app 555 to appear to the end user as a native application.

Figure 6:
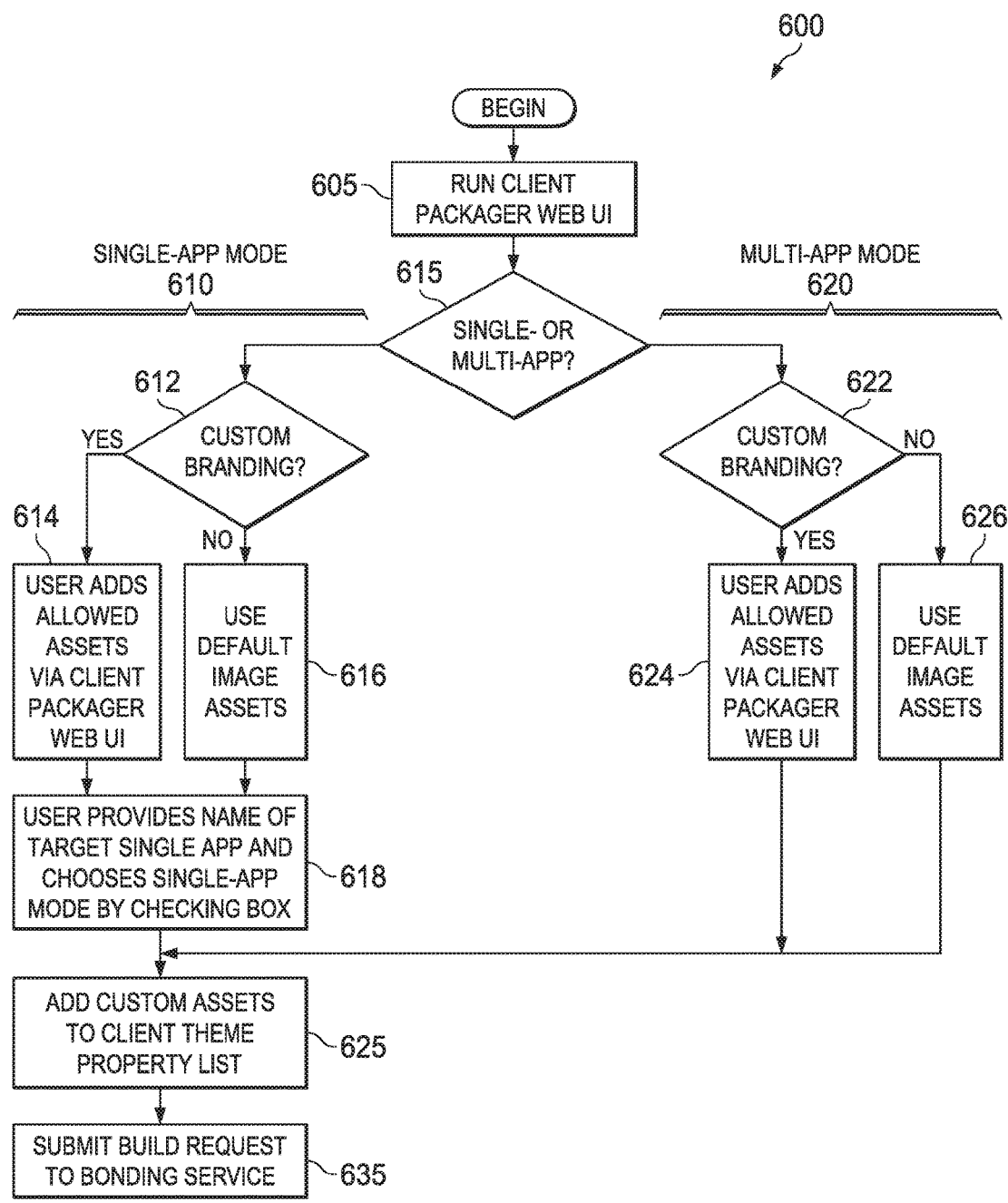
FIG. 6 is a flow diagram illustrating example user interactions with an enterprise application development and deployment system in generating a build request.

FIG. 6 is a flow diagram illustrating one example of user interactions with Client Packager 500 via a web-based user interface. When a user wants to create a custom version of a managed container, the user may direct their browser to a Client Packager web UI (605). The Client Packager web UI may be configured to run in single-application mode 610 or multi-application mode 620 (615). In single-application mode 610, a decision is made as to whether the desired single application is to be customized with branding information (612). If so, the user is prompted to add allowed assets such as image assets, logo(s), icon(s), etc. associated with a particular enterprise (614). Otherwise, default image assets are used (616). The user is also prompted to provide a name of the target desired single application (618). When the single-application mode is checked, the web access service, via the Client Packager web UI, adds the custom assets specified by the user to a client theme property list (625). The web access service then prepares a build request accordingly and submits same to the bonding service of the Client Packager (635). Likewise, in multi-application mode 620, a decision is made as to whether the desired single application is to be customized with branding information (622). If so, the user is prompted to add allowed assets such as image assets, logo(s), icon(s), etc. associated with a particular enterprise (624). Otherwise, default image assets are used (626). Unlike in single-application model 610, however, the user is not prompted to provide a name of an application or required to specifically select the multi-application mode. In this case, the web access service, via the Client Packager web UI, automatically adds the custom assets specified by the user, if any, to a client theme property list (625). The web access service then prepares a build request accordingly and submits same to the bonding service of the Client Packager (635), as described above.

In some embodiments, the user not only has the option to give a custom application a different name, change the branding, change the effects, make it a single use mode if the user wants to do so, but the user also has the option of choosing (e.g., via a pull down or up menu or popup window) from a list of MDM vendors within the Client Packager web UI (e.g., packager web client 507). When the user selects an MDM vendor from the list and selects the "build" function, the Client Packager will build the custom version with all of the user's branding customizations as well as the selected MDM SDK functionality, for instance, utilizing build scripts 597 in a build process described above.

Figure 7:
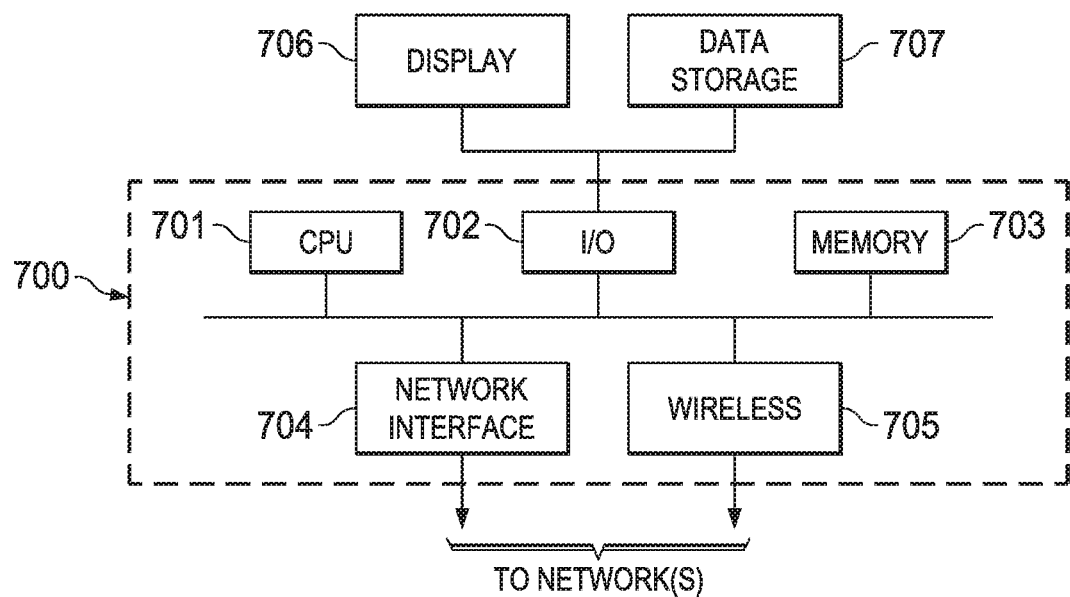
FIG. 7 depicts a diagrammatic representation of a data processing system for implementing some embodiments disclosed herein.

FIG. 7 depicts a diagrammatic representation of a data processing system for implementing some embodiments disclosed herein. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet. The backend servers and client devices described above may each be a data processing system that is the same as or similar to data processing system 700. Additionally, functional components necessary to implement embodiments disclosed herein may reside on one or more data processing systems that are the same as or similar to data processing system 700.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" Is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   receiving, by an application gateway embodied on a server machine through a user interface running on a computing device communicatively connected to the application gateway, a request to build a custom version of a client program of the application gateway, the request including configuration information for the custom version of the client program of the application gateway, the configuration information including user-specified settings indicating that the custom version of the client program of the application gateway is to be built for a desktop computing environment and that the custom version of the client program of the application gateway is to be built to allow an end user to access a single application through the custom version of the client program of the application gateway;
   preparing, by the application gateway, a build request for building the custom version of the client program of the application gateway, the build request containing the configuration information which includes the user-specified settings received through the user interface;
   communicating, by the application gateway, the build request to a bonding client running on a workstation, the workstation specific to an operating system platform for the desktop computing environment;
   building, by the bonding client, the custom version of the client program of the application gateway specific to the operating system platform for the desktop computing environment, the building including running an application building process that is controlled by the bonding client running on the workstation, the application building process comprising executing build scripts in accordance with the configuration information, wherein the build scripts, when executed in accordance with the configuration information, create the custom version of the client program of the application gateway specific to the operating system platform for the desktop computing environment from application gateway client source code in a local cache accessible by the bonding client, wherein the custom version of the client program of the application gateway thus created is a user-customized variation of a managed container that is configured to hold at most a single application, hide multi-application features from end users, interact with the application gateway, receive services from the application gateway, and provide a secure shell for the single application on a user device having the operating system platform for the desktop computing environment;
   uploading, by the bonding client, the user-customized variation of the managed container specific to the desktop computing environment to the application gateway to be persisted in a storage location accessible by the application gateway; and
   sending, by the application gateway, a response to the computing device, the response containing a link to the storage location of the user-customized variation of the managed container.

2. The method according to claim 1, further comprising:
   pushing or providing the user-customized variation of the managed container to a desktop computing device having the operating system platform.

3. The method according to claim 1, wherein the application gateway comprises a web access service and a bonding service, wherein the user interface runs in a browser application on the computing device, the web access service providing a packager web client accessible through the browser application on the computing device, the build request prepared by the packager web client and communicated to the bonding client through the web access service and the bonding service of the application gateway.

4. The method according to claim 1, wherein the application gateway comprises an authentication service and wherein, when a user of the user-customized variation of the managed container is authenticated by the application gateway through a request sent by the user-customized variation of the managed container, the single application is run directly within the secure shell provided by the user-customized variation of the managed container on the user device.

5. The method according to claim 1, wherein at runtime of the user-customized variation of the managed container, the user-customized variation of the managed container communicates with the application gateway, downloads the single application from the application gateway, and installs the single application onto the user device.

6. The method according to claim 1, wherein the user-customized variation of the managed container is native to the operating system platform and wherein the single application is platform-independent and runs inside of the user-customized variation of the managed container.

7. The method according to claim 1, wherein the single application comprises an electronic document management application.

8. A system, comprising:
   a server machine having an application gateway; and
   a workstation having a bonding client;
   the server machine having:
      a processor;
      a non-transitory computer-readable medium; and
      stored instructions translatable by the processor to cause the application gateway to perform:
         receiving, through a user interface running on a computing device communicatively connected to the application gateway, a request to build a custom version of a client program of the application gateway, the request including configuration information for the custom version of the client program of the application gateway, the configuration information including user-specified settings indicating that the custom version of the client program of the application gateway is to be built for a desktop computing environment and that the custom version of the client program of the application gateway is to be built to allow an end user to access a single application through the custom version of the client program of the application gateway;
         preparing a build request for building the custom version of the client program of the application gateway, the build request containing the configuration information which includes the user-specified settings received through the user interface;
communicating the build request to the bonding client running on the workstation, the workstation specific to an operating system platform for the desktop computing environment; and
sending a response to the computing device;
the workstation having:
a processor;
a non-transitory computer-readable medium; and
stored instructions translatable by the processor to cause the bonding client to perform:
building the custom version of the client program of the application gateway specific to the operating system platform for the desktop computing environment, the building including running an application building process that is controlled by the bonding client running on the workstation, the application building process comprising executing build scripts in accordance with the configuration information, wherein the build scripts, when executed in accordance with the configuration information, create the custom version of the client program of the application gateway specific to the operating system platform for the desktop computing environment from application gateway client source code in a local cache accessible by the bonding client, wherein the custom version of the client program of the application gateway thus created is a user-customized variation of a managed container that configured to hold at most a single application, hide multi-application features from end users, interact with the application gateway, receive services from the application gateway, and provide a secure shell for the single application on a user device having the operating system platform for the desktop computing environment; and
uploading the user-customized variation of the managed container specific to the desktop computing environment to the application gateway to be persisted in a storage location accessible by the application gateway, wherein the response sent by the application gateway to the computing device contains a link to the storage location of the user-customized variation of the managed container specific to the desktop computing environment.

9. The system of claim 8, wherein the stored instructions are further translatable by the processor of the server machine to cause the application gateway to perform:
pushing or providing the user-customized variation of the managed container a desktop computing device having the operating system platform.

10. The system of claim 8, wherein the application gateway comprises a web access service and a bonding service, wherein the user interface runs in a browser application on the computing device, the web access service providing a packager web client accessible through the browser application on the computing device, the build request prepared by the packager web client and communicated to the bonding client through the web access service and the bonding service of the application gateway.

11. The system of claim 8, wherein the application gateway comprises an authentication service and wherein, when a user of the user-customized variation of the managed container is authenticated by the application gateway through a request sent by the user-customized variation of the managed container, the single application is run directly within the secure shell provided by the user-customized variation of the managed container on the user device.

12. The system of claim 8, wherein at runtime of the user-customized variation of the managed container, the user-customized variation of the managed container communicates with the application gateway, downloads the single application from the application gateway, and installs the single application onto the user device.

13. The system of claim 8, wherein the user-customized variation of the managed container is native to the operating system platform and wherein the single application is platform-independent and runs inside of the user-customized variation of the managed container.

14. The system of claim 8, wherein the single application comprises an electronic document management application.

15. A computer program product comprising a non-transitory computer-readable medium storing instructions translatable by a system comprising a server machine having an application gateway and a workstation having a bonding client to perform:
receiving, by the application gateway through a user interface running on a computing device communicatively connected to the application gateway, a request to build a custom version of a client program of the application gateway, the request including configuration information for the custom version of the client program of the application gateway the configuration information including user-specified settings indicating that the custom version of the client program of the application gateway is to be built for a desktop computing environment and that the custom version of the client program of the application gateway is to be built to allow an end user to access a single application through the custom version of the client program of the application gateway;
preparing, by the application gateway, a build request for building the custom version of the client program of the application gateway, the build request containing the configuration information which includes the user-specified settings received through the user interface;
communicating, by the application gateway, the build request to the bonding client running on the workstation, the workstation specific to an operating system platform for the desktop computing environment;
building, by the bonding client, the custom version of the client program of the application gateway specific to the operating system platform for the desktop computing environment, the building including running an application building process that is controlled by the bonding client running on the workstation, the application building process comprising executing build scripts in accordance with the configuration information, wherein the build scripts, when executed in accordance with the configuration information, create the custom version of the client program of the application gateway specific to the operating system platform for the desktop computing environment from application gateway client source code in a local cache accessible by the bonding client, wherein the custom version of the client program of the application gateway thus created is a user-customized variation of a managed container that is configured to hold at most a single application, hide multi-application features from end users, interact with the application gateway, receive services from the application gateway, and provide a secure shell for the single application on a user device having the operating system platform for the desktop computing environment;

uploading, by the bonding client the user-customized variation of the managed container specific to the desktop computing environment to the application gateway to be persisted in a storage location accessible by the application gateway; and sending, by the application gateway, a response to the computing device, the response containing a link to the storage location of the user-customized variation of the managed container.

16. The computer program product of claim 15, wherein the instructions are further translatable by the system to perform:

pushing or providing the user-customized variation of the managed container to a desktop computing device having the operating system platform.

17. The computer program product of claim 15, wherein the application gateway comprises a web access service and a bonding service, wherein the user interface runs in a browser application on the computing device, the web access service providing a packager web client accessible through the browser application on the computing device, the build request prepared by the packager web client and communicated to the bonding client through the web access service and the bonding service of the application gateway.

18. The computer program product of claim 15, wherein the application gateway comprises an authentication service and wherein, when a user of the user-customized variation of the managed container is authenticated by the application gateway through a request sent by the user-customized variation of the managed container, the single application is run directly within the secure shell provided by the user-customized variation of the managed container on the user device.

19. The computer program product of claim 15, wherein at runtime of the user-customized variation of the managed container, the user-customized variation of the managed container communicates with the application gateway, downloads the single application from the application gateway, and installs the single application onto the user device.

20. The computer program product of claim 15, wherein the user-customized variation of the managed container is native to the operating system platform and wherein the single application is platform-independent and runs inside of the user-customized variation of the managed container.

* * * * *